Patented July 28, 1953

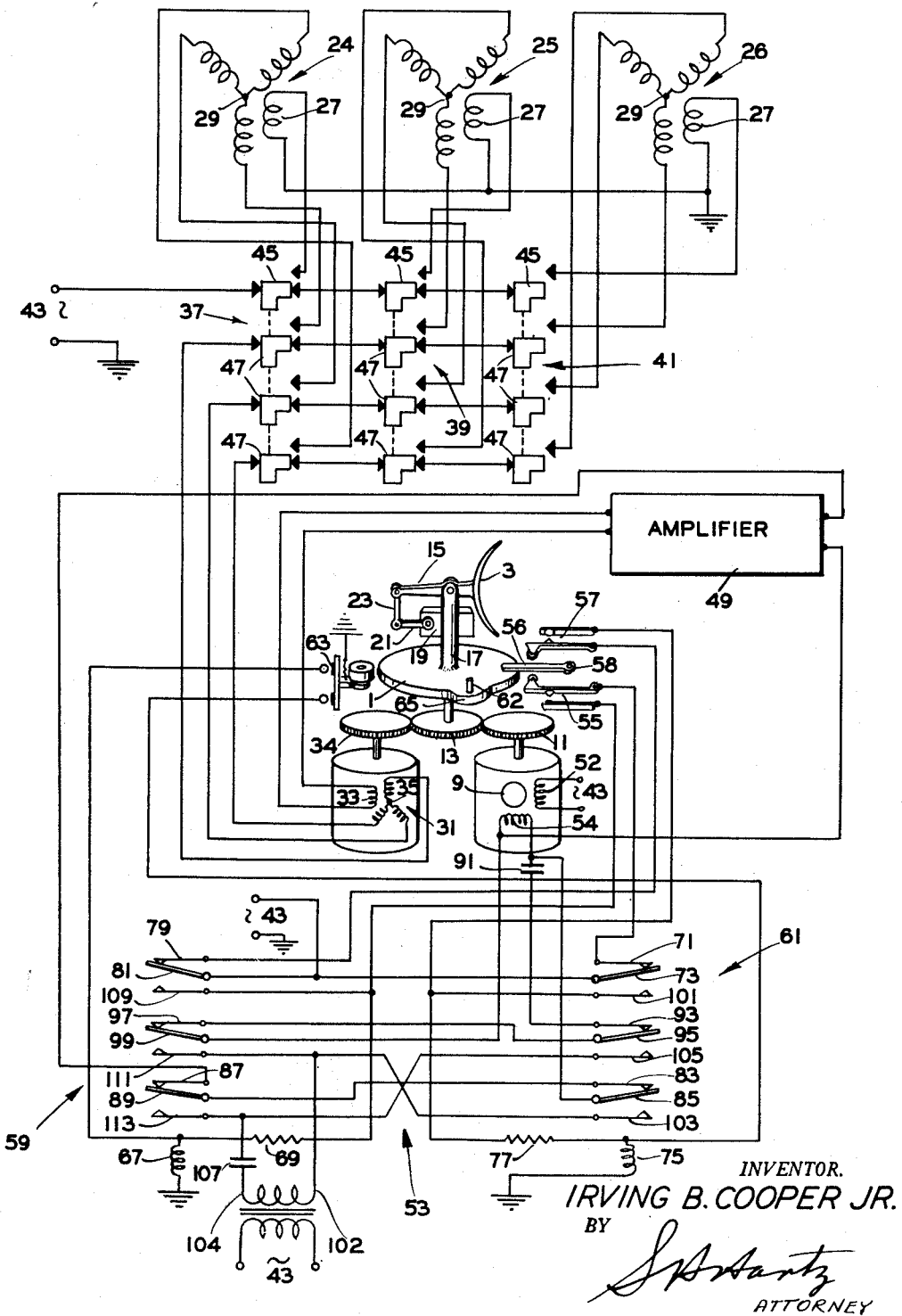

2,647,229

UNITED STATES PATENT OFFICE 2,647,229

CONTROL SYSTEM

Irving B. Cooper, Jr., Maywood, N. J., assignor to Bendix Aviation Corporation, Teterboro, N. J., a corporation of Delaware Application March 3, 1950, Serial No. 147,342

10 Claims. (Cl. 318—30)

1

The invention relates to control systems, and more particularly to a system for remotely controlling a rotating device.

The invention is an improvement on the structure shown and described in co-pending Kimball et al. application Serial No. 117,218, filed September 22, 1949, for a Control System, and the main object of the invention is to rotate a device, such as a television antenna, through a full 360° and control the device from a remote point, yet avoid the use of slip rings or wave guide rotating joints.

The invention contemplates a control system including driving means responsive to a signal for positioning a remotely located device rotatable between predetermined limits preferably spaced from one another at least 360°. Means actuated when the device reaches the limits of rotation disconnects the signal source and applies to the driving means a voltage opposite in phase to the signal to rotate the device in the opposite direction. Means actuated when the device is rotated through a predetermined angle from its limits of rotation disconnects the voltage source and applies the signal to the driving means to rotate the device to signal position.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The single figure of the drawing shows a schematic diagram of a novel control system constructed according to the invention.

Referring now to the drawing for a more detailed description of the novel control system of the present invention, the system is shown as comprising an antenna base 1 supporting an antenna 3 and mounted for azimuth rotation about a vertical axis. A motor 9 drives base 1 in azimuth through gears 11, 13. The antenna may be mounted on a member 15 pivoted for limited elevation rotation about a horizontal axis to an upright 17 rigid with base 1. A motor 19 drives the antenna and supporting member in elevation through an arm 21 and link 23. The elevation control (not shown) may be substantially as disclosed in the above co-pending application.

The novel azimuth control constructed according to the invention includes a plurality of transmitter inductive devices 24, 25, 26, the number of transmitters corresponding to the number of stations to which the antenna is to be directed automatically, and each transmitter includes a rotor winding 27 and a three-phase stator winding 29. Each rotor winding 27 preferably is preset relative to the associated stator winding 29 to provide a signal of predetermined phase voltage corresponding to the position of the station to which the antenna is to be directed. A receiver inductive device 31 has a rotor winding 33 mechanically connected to azimuth motor 9 through gears 11, 13, 34 and a three-phase stator winding 35, which may be connected selectively by four-pole-double-throw switches 37, 39, 41 or other suitable circuit connecting devices, to transmitters 24, 25, 26, respectively. Rotor windings 27 of transmitters 24, 25, 26 are selectively connected to an alternating current source 43 through contacts 45 of switches 37, 39, 41, and stator windings 29 of transmitters 24, 25, 26 are selectively connected through contacts 47 of switches 37, 39, 41 to stator winding 35 of receiver 31.

Rotor winding 33 of receiver 31 is connected to a two-stage amplifier 49. The amplified signal is fed through a control circuit 53 to the variable phase motor winding 54 of motor 9, whereupon base 1 and rotor 33 of receiver 31 are driven by motor 9 until receiver 31 is in correspondence with the transmitter to which receiver 31 is connected through one of the switches 37, 39, 41. The fixed phase 52 of motor 9 is energized by alternating current source 43.

The control circuit includes a pair of normally open limit switches 55, 57 actuated by a lever 56 pivoted at 58 and engaged by a pin 62, extending from base 1, when the base reaches the limits of rotation. With this arrangement, the base may rotate through a full 360° angle. Multiple contact relays 59, 61 are energized upon actuation of switches 55, 57, respectively, and disconnect the output of amplifier 49 from motor winding 54, and instead, connect the motor winding to power source 43 so that the phase of the voltage applied to the motor is opposite to the phase of the signal, whereby the base is rotated by the motor away from the corresponding limit and pin 62 releases the switch. Relays 59, 61 are of the self-energizing type and remain energized even after switches 55, 57 are in open circuit position.

A normally open switch 63 is actuated by a projection 65 on base 1 adjacent pin 62 when the base rotates to a position approximately midway between its limits. Switch 63, when actuated, de-energizes relays 59, 61 so that motor winding 54 is connected to the output of amplifier 49, whereupon the base is driven by the motor to a position in which receiver 31 is in correspondence with the transmitter to which receiver 31 is connected through one of the switches 37, 39, 41.

The actuating solenoid 67 of relay 59 is energized by power source 43 in series with normally closed contacts 71, 73 of relay 61, switch 55 and resistor 69. The actuating solenoid 75 of relay 61 is energized by power source 43 in series with normally closed contacts 79, 81 of relay 59, switch 57 and resistor 77. Since solenoid 67 of relay 59 is energized through contacts 71, 73 of relay 61, and since solenoid 75 of relay 61 is energized through contacts 79, 81 of relay 59, only one relay can be energized at any time even though both switches 55, 57 are accidentally closed.

Resistors 69, 77 are grounded upon closing switch 63 by projection 65 so that relays 59 and 61 are de-energized. Resistors 69, 77 preferably are of sufficient value to prevent short-circuiting the power supply when switch 63 is closed.

Motor winding 54 of motor 9 is connected to the output of amplifier 49 through normally closed contacts 83, 85 of relay 61 and normally closed contacts 87, 89 of relay 59. A phasing condenser 91 is connected in parallel with contacts 83, 85 and 87, 89 through normally closed contacts 93, 95 of relay 61 and normally closed contacts 97, 99 of relay 59.

As indicated above, when switch 57 is closed, relay 61 is energized and the output of amplifier 49 is disconnected from motor winding 54. The relay is self-energized, even after switch 57 opens, through contacts 73 and 101. Motor winding 54 is connected to one terminal 102 of power source 43 through contacts 103, 85 of relay 61, and to the other terminal 104 of power source 43 through contacts 99, 97 of relay 59, contacts 95, 105 of relay 61, and phasing condenser 107. The voltage impressed on motor winding 54 under these conditions is opposite in phase to the instantaneous output of amplifier 49.

When switch 55 is closed, relay 59 is energized and the output of amplifier 49 is disconnected from motor winding 54 and the relay is self-energized, even after switch 55 opens, through contacts 81 and 109. Motor winding 54 is connected to terminal 102 of power source 43 through contacts 99, 111 of relay 59, and to terminal 104 of power source 43 through contacts 85, 83 of relay 61, contacts 89, 113 of relay 59 and phasing condenser 107. The voltage impressed on motor winding 54 under these conditions is opposite in phase to the instantaneous output of amplifier 49.

The operation of the control system is as follows:

Assuming that the base is to be positioned in correspondence with transmitter 24, switch 37 is closed and a signal is generated in receiver 31. The signal is amplified by amplifier 49 and is impressed on motor winding 54. When the present position of the base and the position to which the base is to be moved disagree less than 180 electrical degrees of the associated transmitter 24 and receiver 31, motor 9 drives the base directly to the desired position in response to the signal from receiver 31. However, if the present position of the base and the position to which the base is to be moved disagree more than 180 electrical degrees of transmitter 24 and receiver 31, then the base is rotated in the wrong direction by the motor in response to the signal from receiver 31.

Assuming that the base is rotating toward its limit at switch 55, then when the base reaches its limit, switch 55 is closed, relay 59 is energized and the output of amplifier 49 is disconnected from motor winding 54 and in its stead, power source 43 is connected to the motor winding so that the voltage impressed thereon is opposite in phase to that of the output of amplifier 49. The base is rotated in the opposite direction, that is, away from limit switch 55, and continues rotating in this direction until projection 65 closes switch 63, whereupon relay 59 is de-energized. Power source 43 is disconnected from motor winding 54 and the output of amplifier 49 is again connected thereto. Since the position of the base now disagrees with the position to which it is to be moved by less than 180 electrical degrees of transmitter 24 and receiver 31, the base is rotated by motor 9 directly to the desired position, that is, until receiver 31 is in agreement with transmitter 24.

When the base is rotated to the opposite limit, switch 57 is closed and energizes relay 61. The sequence of operations is substantially the same as described above.

The control system provides for rotating the base through a full 360° and controlling the base from a remote point, yet avoids the use of slip rings or wave guide rotating joints.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a control system for positioning a device rotatable between limits in response to a signal, driving means responsive to the signal for rotating said device, means actuated when said device reaches the limits of rotation to apply to said driving means a voltage opposite in phase to the signal to rotate said device in the opposite direction, and separate circuit interrupting means intermediate said limits of rotation and actuated when said device is rotated through a predetermined angle from its limits of rotation and adapted to apply the signal to said driving means to rotate said device to signal position.

2. In a control system for positioning a device rotatable between limits spaced from one another at least 360° in response to a signal, driving means responsive to the signal for rotating said device between said limits, means actuated when said device reaches said limits and adapted to apply to said driving means a voltage opposite in phase to the signal to rotate said device in the opposite direction, and separate circuit interrupting means intermediate said limits and actuated when said device is substantially midway between said limits and adapted to apply the signal to said driving means to rotate said device to signal position.

3. In a control system for positioning an antenna in response to a signal and having limited rotation in at least one direction, reversible driving means responsive to the signal for rotating said device, means actuated when said device reaches the limit of rotation, a multiple contact relay energized by said limit means and adapted to apply to said driving means a voltage opposite in phase to the signal to rotate said device in the opposite direction, and separate switching means in the energizing circuit for said relay actuated when said device is rotated through a predetermined angle from said limit and adapted to de-energize said relay and to apply the signal to said driving means to rotate said device to signal position.

4. In a control system for positioning a device rotatable between limits in response to a signal, driving means responsive to the signal for rotating said device, a pair of switches actuated when said device reaches said limits, a multiple contact relay energized by each of said switches and adapted to apply to said driving means a voltage opposite in phase to the signal to rotate said device in the opposite direction, and a separate switch in the energizing circuits for said relays actuated when said device is rotated through a predetermined angle from said limits and adapted to de-energize said relays and to apply the signal to said driving means to rotate said device to signal position.

5. In a control system for positioning a device rotatable between limits in response to a signal, driving means responsive to the signal for rotating said device, a pair of switches actuated when said device reaches said limits, a multiple contact relay having a solenoid energized by each of said switches and adapted to apply to said driving means a voltage opposite in phase to the signal to rotate said device in the opposite direction, the solenoid of each of said relays being connected to the associated switch through normally closed contacts of the other relay, and a separate switch in the energizing circuits for said relays actuated when said device is rotated through a predetermined angle from said limits and adapted to de-energize said relays and to apply the signal to said driving means to rotate said device to signal position.

6. In a control system for positioning a device rotatable between limits in response to a signal, means for providing a signal, means for providing a voltage opposite in phase to the signal, driving means responsive to the signal for rotating said device, a pair of switches actuated when said device reaches said limits and adapted to disconnect said signal means from said driving means and to connect said voltage means to said driving means to apply to said driving means a voltage opposite in phase to the signal to rotate said device in the opposite direction, and a separate switch intermediate said limits and actuated when said device is rotated through a predetermined angle from said limits and adapted to disconnect said voltage means from said driving means and to connect said signal means to said driving means to rotate said device to signal position.

7. In an antenna system, an antenna rotatable between limits, means for providing a plurality of predetermined signals corresponding to predetermined positions of said antenna, driving means responsive to said signals for rotating said antenna to said positions, means for selectively impressing one of the signals of said signal means on said driving means, means actuated when said antenna reaches said limits and adapted to apply to said driving means a voltage opposite in phase to the signal to rotate said antenna in the opposite direction, and means intermediate said limits and actuated when said antenna is at a predetermined angle from said limits and adapted to apply the signal to said driving means to rotate said antenna to signal position.

8. In an antenna system, an antenna rotatable between limits spaced from one another at least 360°, means for providing a plurality of predetermined signals corresponding to predetermined positions of said antenna, driving means responsive to said signals for rotating said antenna to said positions, means for selectively impressing one of the signals of said signal means on said driving means, means actuated when said antenna reaches said limits and adapted to apply to said driving means a voltage opposite in phase to the signal to rotate said antenna in the opposite direction, and means intermediate said limits and actuated when said antenna is substantially midway between said limits and adapted to apply the signal to said driving means to rotate said device to signal position.

9. In an antenna system, an antenna rotatable between limits, means for providing a plurality of predetermined signals corresponding to predetermined positions of said antenna, driving means responsive to said signals for rotating said antenna to said positions, a pair of limit switches actuated when said antenna reaches said limits, a multiple contact relay energized by each of said switches and adapted to apply to said driving means a voltage opposite in phase to the signal to rotate said antenna in the opposite direction, and a switch intermediate said limits and actuated when said antenna is rotated through a predetermined angle from said limits and adapted to de-energize said relays and to apply the signal to said driving means to rotate said device to signal position.

10. In an antenna system, an antenna rotatable between limits, voltage means adapted to provide voltages of opposite phases, means including a plurality of preset transmitter inductive devices and a receiver inductive device for providing a plurality of predetermined signals corresponding to predetermined positions of said antenna, driving means responsive to the signals for rotating said antenna to said positions, switching means for selectively impressing one of the signals of said signal means on said driving means, a pair of limit switches actuated when said antenna reaches said limits and adapted to disconnect said signal means from said driving means and to connect said voltage means to said driving means to apply to said driving means a voltage opposite in phase to the signal to rotate said antenna in the opposite direction, a switch intermediate said limits and actuated when said antenna is rotated through a predetermined angle from said limits and adapted to disconnect said voltage means from said driving means and to connect said signal means to said driving means to rotate said antenna to signal position.

IRVING B. COOPER, Jr.

References Cited in the file of this patent
UNITED STATES PATENTS

| Number | Name | Date |
| --- | --- | --- |
| 1,637,039 | Hewlett et al. | July 26, 1927 |
| 1,982,350 | Mittag | Nov. 27, 1934 |
| 2,439,094 | Miles | Apr. 6, 1948 |
| 2,481,331 | Newbold | Sept. 6, 1949 |